US012795641B2

(12) United States Patent
Xue et al.

(10) Patent No.: US 12,795,641 B2
(45) Date of Patent: Nov. 10, 2026

(54) METHODS, DEVICES, AND SYSTEMS FOR TRANSMITTING MULTIPLE TRANSPORT BLOCK GROUPS

(71) Applicant: ZTE Corporation, Shenzhen (CN)

(72) Inventors: Yan Xue, Shenzhen (CN); Feng Xie, Shenzhen (CN); Hanchao Liu, Shenzhen (CN); Fei Wang, Shenzhen (CN); Jun Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 231 days.

(21) Appl. No.: 18/592,831

(22) Filed: Mar. 1, 2024

(65) Prior Publication Data

US 2024/0205909 A1 Jun. 20, 2024

Related U.S. Application Data

(63) Continuation of application No. PCT/CN2021/123014, filed on Oct. 11, 2021.

(51) Int. Cl.
*H04W 4/00* (2018.01)
*H04L 1/1812* (2023.01)
(Continued)

(52) U.S. Cl.
CPC ........... *H04W 72/12* (2013.01); *H04L 1/1812* (2013.01); *H04W 72/0446* (2013.01); *H04W 72/0453* (2013.01); *H04W 72/231* (2023.01)

(58) Field of Classification Search
CPC ............. H04W 72/12; H04W 72/0446; H04W 72/0453; H04W 72/231; H04L 1/1812;
(Continued)

(56) References Cited

U.S. PATENT DOCUMENTS 11,419,005 B2 * 8/2022 Chen .................... H04L 1/0023
2019/0335457 A1 * 10/2019 Peng .................. H04W 72/046
(Continued)

FOREIGN PATENT DOCUMENTS

CN 109309958 A 2/2019
CN 109639398 A 4/2019
(Continued)

OTHER PUBLICATIONS

Office action issued in Japanese application No. 2024-516420, dated Jan. 7, 2025, 11 pages (with English translation).
(Continued)

*Primary Examiner* — Thai Dinh Hoang
(74) *Attorney, Agent, or Firm* — Crowell & Moring LLP

(57) ABSTRACT

The present disclosure describes methods, system, and devices for transmitting multiple transport block (TB) groups. The method includes transmitting a set of TB groups between a first wireless device and a second wireless device by: receiving a resource indication from the first wireless device, wherein: the resource indication indicates resource allocation of m groups of TBs, and m is an integer larger than 1; each TB mapped to a same codeword in the m groups of TBs is mapped to different time-frequency resource in the resource space; a group of TBs in the m groups of TBs comprises n TBs mapped to a same codeword, and n is an integer larger than 0; and each TB in the m groups of TBs is capable of being packaged separately at a transmitting end, and capable of being delivered separately to an upper layer at a receiving end.

23 Claims, 11 Drawing Sheets

(51) Int. Cl.
*H04W 72/0446* (2023.01)
*H04W 72/0453* (2023.01)
*H04W 72/12* (2023.01)
*H04W 72/231* (2023.01)

(58) Field of Classification Search
CPC ....... H04L 1/04; H04L 5/0044; H04L 5/0053; H04L 5/0094; H04L 1/0041
See application file for complete search history.

(56) References Cited

U.S. PATENT DOCUMENTS

| | | | | |
|---|---|---|---|---|
| 2019/0379489 | A1* | 12/2019 | Hwang | H04L 1/0063 |
| 2020/0106566 | A1* | 4/2020 | Yeo | H04L 1/1812 |
| 2020/0344009 | A1* | 10/2020 | Shao | H04W 76/11 |
| 2021/0067194 | A1 | 3/2021 | Takeda et al. | |
| 2021/0160879 | A1* | 5/2021 | Lin | H04W 72/121 |
| 2021/0321414 | A1 | 10/2021 | Yeo et al. | |
| 2021/0360638 | A1 | 11/2021 | Lin | |
| 2022/0256573 | A1* | 8/2022 | Frenne | H04L 1/1812 |
| 2023/0254795 | A1* | 8/2023 | Ryu | H04W 72/21 370/350 |
| 2024/0163894 | A1* | 5/2024 | Xiong | H04L 1/1854 |
| 2024/0205895 | A1* | 6/2024 | Xue | H04W 72/0446 |
| 2024/0357590 | A1* | 10/2024 | Zeng | H04L 1/1812 |

FOREIGN PATENT DOCUMENTS

| | | | |
|---|---|---|---|
| JP | WO2019/049283 | A1 | 10/2020 |
| WO | WO 2019/005838 | A1 | 1/2019 |
| WO | WO 2021/030947 | A1 | 2/2021 |
| WO | WO 2021029738 | A1 | 2/2021 |
| WO | WO 2021066627 | A1 | 4/2021 |

OTHER PUBLICATIONS

Extended European Search Report issued in European application No. 2190132.5, dated Sep. 12, 2024, 12 pages.

International Search Report and Written Opinion, dated Jul. 4, 2022, pp. 1-8, issued in International Application No. PCT/CN2021/123014, National Intellectual Property Administration, Beijing, China.

Huawei, HiSilicon, Remaining issues on CW mapping, Apr. 16-20, 2018, R1-1803632, 3GPP TSG RAN WG1 Meeting #92bis, Sanya, China.

U.S. Non-Final Office action issued in U.S. Appl. No. 18/591,164 dated Sep. 15, 2026 (19 pages).

* cited by examiner

METHODS, DEVICES, AND SYSTEMS FOR TRANSMITTING MULTIPLE TRANSPORT BLOCK GROUPS

This application is a continuation application of PCT International Application No. PCT/CN2021/123014, filed with the China National Intellectual Property Administration, PRC on Oct. 11, 2021, wherein the content of each of the above-referenced application is incorporated herein by reference in its entirety.

TECHNICAL FIELD

The present disclosure is directed generally to wireless communications. Particularly, the present disclosure relates to methods, devices, and systems for transmitting multiple transport block (TB) groups.

BACKGROUND

Wireless communication technologies are moving the world toward an increasingly connected and networked society. High-speed and low-latency wireless communications rely on efficient network resource management and allocation among one or more user equipment and one or more wireless access network nodes (including but not limited to base stations). A new generation network is expected to provide high speed, low latency and ultra-reliable communication capabilities and fulfill the requirements from different industries and users.

With the rapid evolution of cellular mobile communication systems, more and more applications emerge in various businesses and/or service industries. Some services, such as holographic communication, industrial internet traffic and immersive cloud extended reality (XR), need to meet both ultra-high throughput and ultra-low latency at the same time. This type of services not only has extremely high requirements for throughput, but also high requirements for low latency. There are problems or issues associated with the present wireless communication technology, and it is difficult to meet the reliable transmission of data at a large volume under low-latency requirements.

The present disclosure describes various embodiments for transmitting multiple transport block (TB) groups (also called multiple groups of TBs or TBG), addressing at least one of the problems/issues discussed above. The various embodiments in the present disclosure may enhance performance of enhanced mobile broadband (eMBB) and/or ultra reliable low latency communication (URLLC) and/or provide new scenarios requiring large bandwidth and low latency, improving a technology field in the wireless communication.

SUMMARY

This document relates to methods, systems, and devices for wireless communication, and more specifically, for transmitting multiple transport block (TB) groups.

In one embodiment, the present disclosure describes a method for wireless communication. The method includes transmitting a set of transport block (TB) groups between a first wireless device and a second wireless device by: receiving, by the second wireless device, a resource indication from the first wireless device, wherein: the resource indication indicates resource allocation of m groups of TBs in a resource space comprising a time unit in a time domain and a frequency unit in a frequency domain, and m is an integer larger than 1; each TB mapped to a same codeword in the m groups of TBs is mapped to different time-frequency resource in the resource space; a group of TBs in the m groups of TBs comprises n TBs mapped to a same codeword, and n is an integer larger than 0; and each TB in the m groups of TBs is capable of being packaged separately at a transmitting end, and capable of being delivered separately to an upper layer at a receiving end.

In another embodiment, the present disclosure describes a method for wireless communication. The method includes receiving, by a second wireless device, a higher layer message carrying a radio configuration information of a set of TB groups, wherein: each TB mapped to the same codeword in the m groups of TBs is mapped to different time-frequency resource in a resource space comprising a time unit in a time domain and a frequency unit in a frequency domain, and a group of TBs comprises n TBs mapped to a same codeword, and n is an integer larger than 1, each TB in the m groups of TBs is capable of being packaged separately at a transmitting end, and capable of being delivered separately to an upper layer at a receiving end; in response to the higher layer message, operating, by the second wireless device, according to the radio configuration information of the m groups of TBs.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

Figure 1:
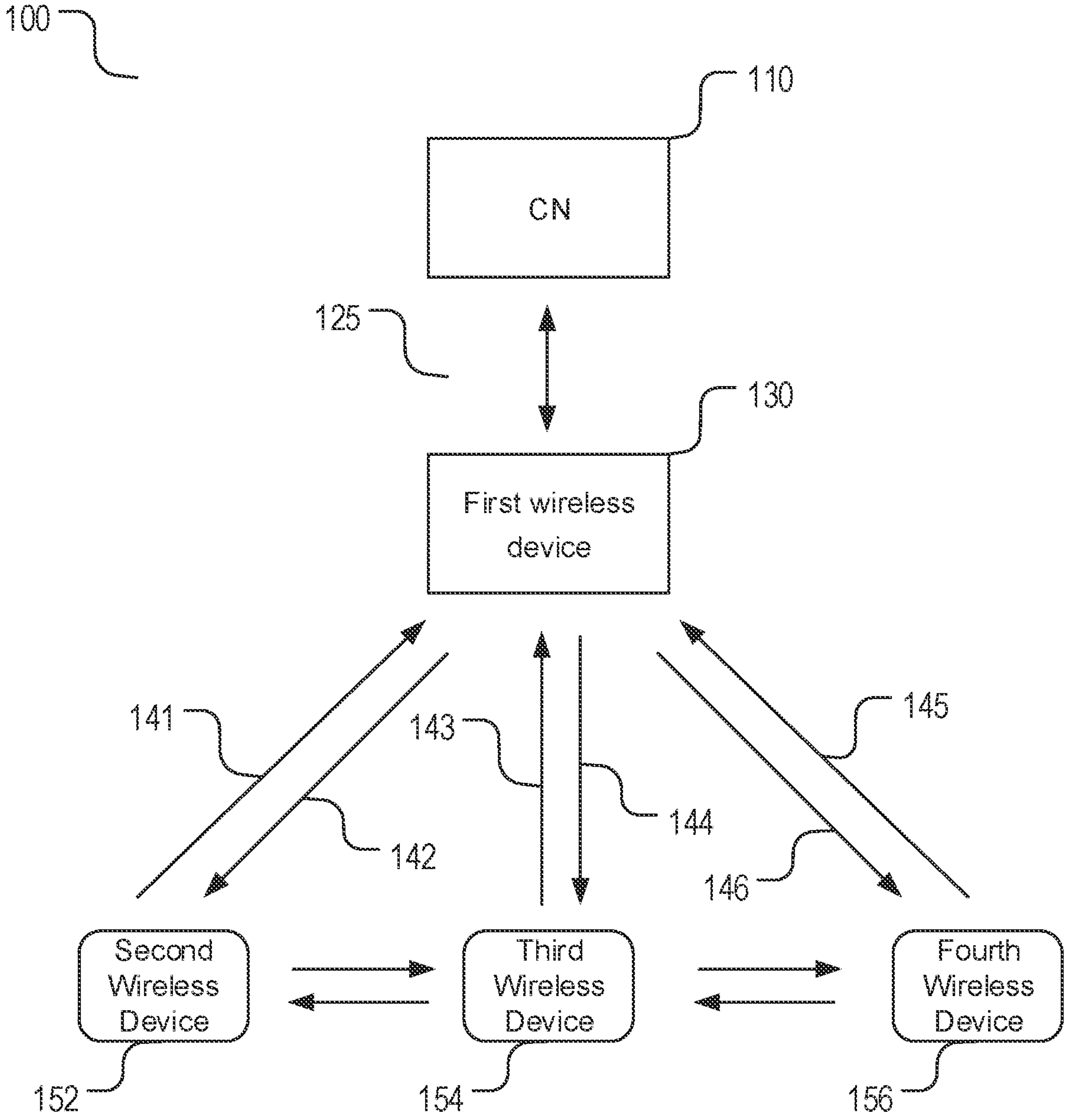
FIG. 1 shows an example of a wireless communication system include a core network, a first wireless device, a second wireless device, a third wireless device, and a fourth wireless device.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various methods and devices for transmitting multiple transport block (TB) groups.

New generation (NG) mobile communication system are moving the world toward an increasingly connected and networked society. High-speed and low-latency wireless communications rely on efficient network resource management and allocation among one or more user equipment and one or more wireless access network nodes (including but not limited to wireless base stations). A new generation network is expected to provide high speed, low latency and ultra-reliable communication capabilities and fulfill the requirements from different industries and users.

With the rapid evolution of cellular mobile communication systems, more and more applications emerge in various businesses and/or service industries. Some services, such as holographic communication, industrial internet traffic and immersive cloud extended reality (XR), need to meet both ultra-high throughput and ultra-low latency at the same time. This type of services integrates the characteristics of the two scenarios of high performance and high efficiency wireless networks: extremely high requirements for throughput, but also high requirements for low latency. For example but not limited, the large bandwidth, high throughput, and low latency scenarios may need the reliable transmission of data at a large volume under low-latency requirements.

In a 4G and/or a 5G system, on a baseband carrier (e.g., also called a cell), each transport block (TB) may be scheduled for transmission on a baseband carrier with a transmission time interval (TTI) as a basic time-domain scheduling unit. Each hybrid automatic repeat request (HARQ) process may be in a TTI. A TB is called a codeword after channel coding process. In the spatial multiplexing transmission, there are up to two codewords, which are called the first codeword and the second codeword according to the layer mapping configuration. A codeword may be mapped to all or part of the layers. Multiple different data streams can be transmitted on different layers simultaneously. After using the spatial multiplexing technology, a UE may be allowed to transmit one TB on a carrier and a HARQ process in response to a single codeword transmission; and/or a UE may be allowed to simultaneously transmit two TBs on a carrier and a HARQ process in response to a two codeword transmission. In other words, for the same user, no more than two TBs may be scheduled in a time-domain transmission unit. In order to increase the throughput, one way is to increase the number of bits contained in a TB, that is, to expand the TB Size (TBS). However, considering factors such as coding and interleaving gain, the TB size is limited. For example, in long term evolution (LTE), a TBS may be required to be no greater than 6144 bits. In response to a TB being larger than 6144 bits, this TB may be divided into multiple code blocks (Code Block, CB) for encoding and transmission.

In various embodiments, each TB may include a cyclical redundancy check (CRC), and each CB in each TB may also include a CRC. When the CRC check of a certain CB fails, only this CB may need to be retransmitted, and the entire TB may not need to be retransmitted.

In some implementations in a 5G new radio (NR), in order to reduce the feedback overhead of CB transmission, a code block group (CBG) method may be used for feedback, that is, multiple CBs may be used as a group to use 1 bit for acknowledgement/negative acknowledgement (ACK/NACK) feedback. One of the issues associated with this approach may be that, when a CB is unsuccessful in transmission, the entire CBG where the wrong CB is located must be retransmitted. Only when the CRC check of all CBs and the CRC check of the entire TB pass, the TB transmission may be considered successful. After using code block segmentation, as the number of CBs and CBGs increases, the supported TBS may increase as well. Because each CB needs a CRC check, the larger the TB, the higher the possibility of CB transmission failure. CB transmission failure may result in CB retransmission. As long as there is a CB transmission failure in the TB, it may be retransmitted and waited. After all the CB transmissions are successful and the CRC of the CB level and the TB level are both verified, the TB may be delivered to the upper layer. One of the issues/problems with this approach is that the more CB and CBG, the longer the waiting time may be. For services with low-latency requirements, such as live broadcast services, data packets must be transmitted correctly within a certain period of time. When it times out, even the transmission is correct, it will be considered unsatisfactory and discarded. Thus, the existing technology may be difficult to meet the requirements of high throughput and low latency at the same time. The larger the TBS, the greater the transmission delay; and the smaller the TBS, the lower the throughput. One of the issues/problems associated with some of the above approaches may be that, for large bandwidth scenarios, even when frequency domain resources are sufficiently available, large throughput and low delay transmission may be difficult to achieve simultaneously.

There are problems or issues associated with the present wireless communication technology, and it is difficult to meet the reliable transmission of data at a high throughput under low-latency requirements. One of the problems/issues is that it may be difficult to achieve differential transmission for multiple TBs, when transmitted data may have differential priority requirement.

The present disclosure describes various embodiments for transmitting multiple transport block (TB) groups, addressing at least one of the problems/issues discussed above. The present disclosure may enhance performance of enhanced mobile broadband (eMBB) and/or ultra reliable low latency communication (URLLC), improving a technology field in the wireless communication.

FIG. 1 shows a wireless communication system 100 including a portion or all of the following: a core network (CN) 110, a first wireless device 130, a second wireless device 152, a third wireless device 154, and a fourth wireless device 156. There may be wireless communication between any two of the first wireless device, the second wireless device, the third wireless device, and the third wireless device.

The first wireless device may include one of the following: a base station; a MAC layer in a wireless device; a scheduling unit; a user equipment (UE); an on-board unit (OBU); a road-side unit (RSU); or an integrated access and backhaul (IAB) node.

The second wireless device, the third wireless device, or the third wireless device may include one of the following: a user equipment (UE); or an integrated access and backhaul (IAB) node.

In various embodiments, the first wireless device 130 may include a wireless node. The second wireless device, the third wireless device, and/or the third wireless device may include one or more user equipment (UE) (152, 154, and 156). The wireless node 130 may include a wireless network base station, a radio access network (RAN) node, or a NG radio access network (NG-RAN) base station or node, which may include a nodeB (NB, e.g., a gNB) in a mobile telecommunications context. In one implementation, the core network 110 may include a 5G core network (5GC or 5GCN), and the interface 125 may include a NG interface. The wireless node 130 (e.g, RAN) may include an architecture of separating a central unit (CU) and one or more distributed units (DUs). In another implementation, the core network 110 may include a 6G core network or any future generation network.

The communication between the RAN and the one or more UE may include at least one radio bearer or channel (radio bearer/channel). Referring to FIG. 1, a first UE 152 may wirelessly receive from the RAN 130 via a downlink radio bearer/channel 142 and wirelessly send communication to the RAN 130 via a uplink radio bearer/channel 141. Likewise, a second UE 154 may wirelessly receive communicate from the RAN 130 via a downlink radio bearer/channel 144 and wirelessly send communication to the RAN 130 via a uplink radio bearer/channel 143; and a third UE 156 may wirelessly receive communicate from the RAN 130 via a downlink radio bearer/channel 146 and wirelessly send communication to the RAN 130 via a uplink radio bearer/channel 145.

Figure 2:
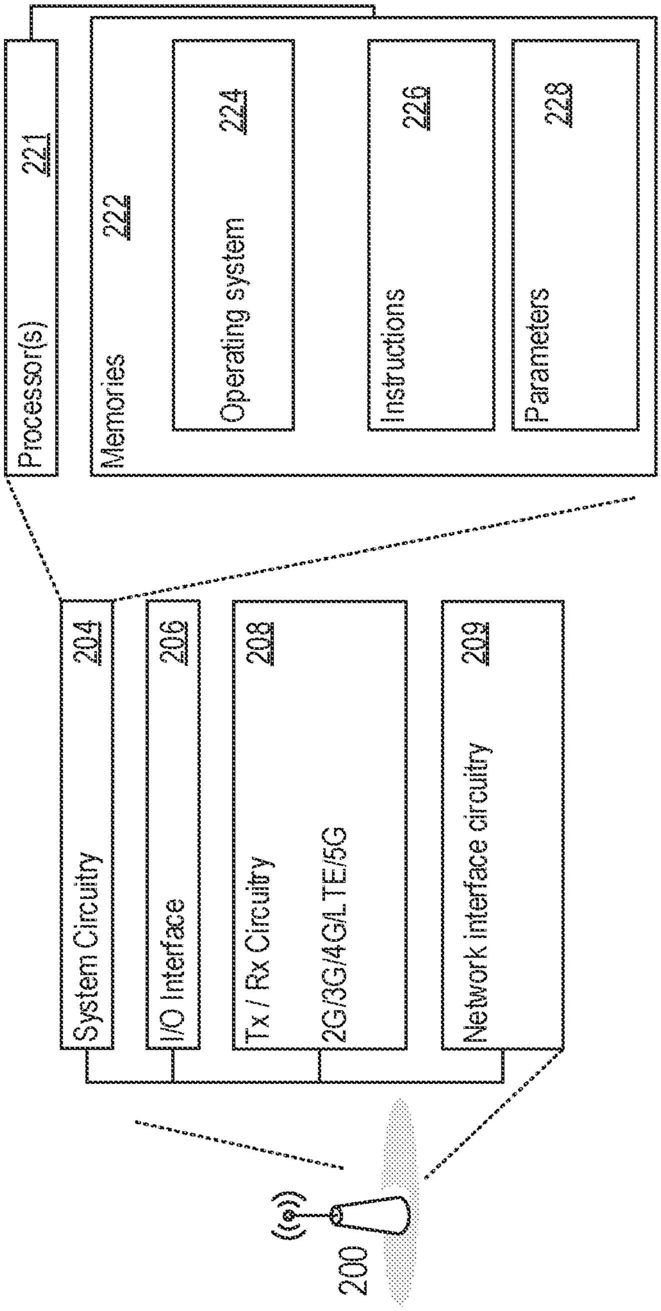
FIG. 2 shows an example of a wireless network node.

FIG. 2 shows an example of electronic device 200 to implement a network base station (e.g., a radio access network node), a core network (CN), and/or an IAB node. Optionally in one implementation, the example electronic device 200 may include radio transmitting/receiving (Tx/Rx) circuitry 208 to transmit/receive communication with UEs and/or other base stations. Optionally in one implementation, the electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
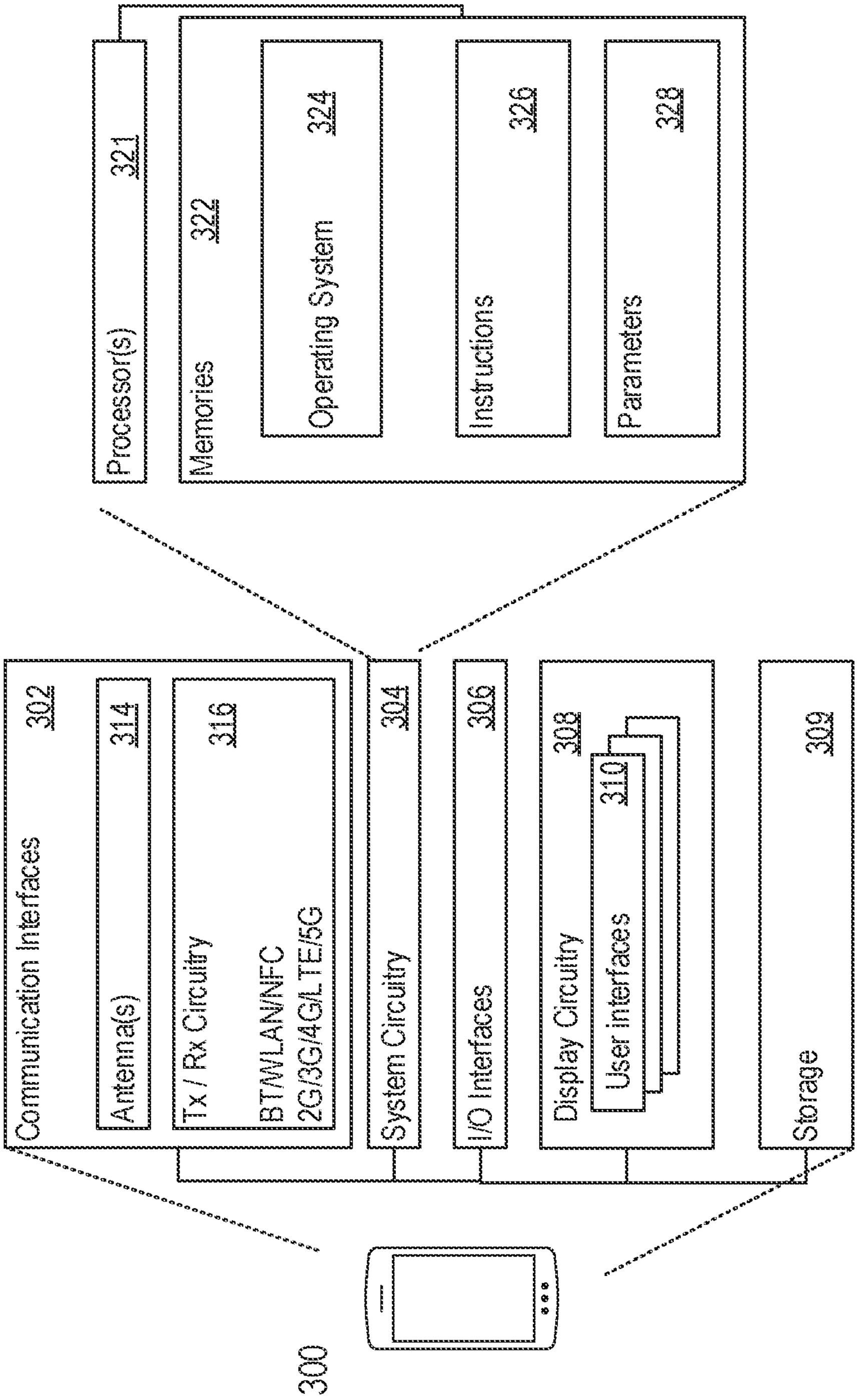
FIG. 3 shows an example of a user equipment.

FIG. 3 shows an example of an electronic device to implement a terminal device 300 (for example, a user equipment (UE)). The UE 300 may be a mobile device, for example, a smart phone or a mobile communication module disposed in a vehicle. The UE 300 may include a portion or all of the following: communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), 5G, 6G, or any future generation communication standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes various embodiments for multiple transport block (TB) groups, which may be implemented, partly or totally, on one or more electronic device 200 and/or one or more terminal device 300 described above in FIGS. 2-3. Various embodiments include methods for multiple transport block (TB) groups, solving at least one of the problems in achieving large bandwidth, high throughput and low latency transmission.

Figure 4:
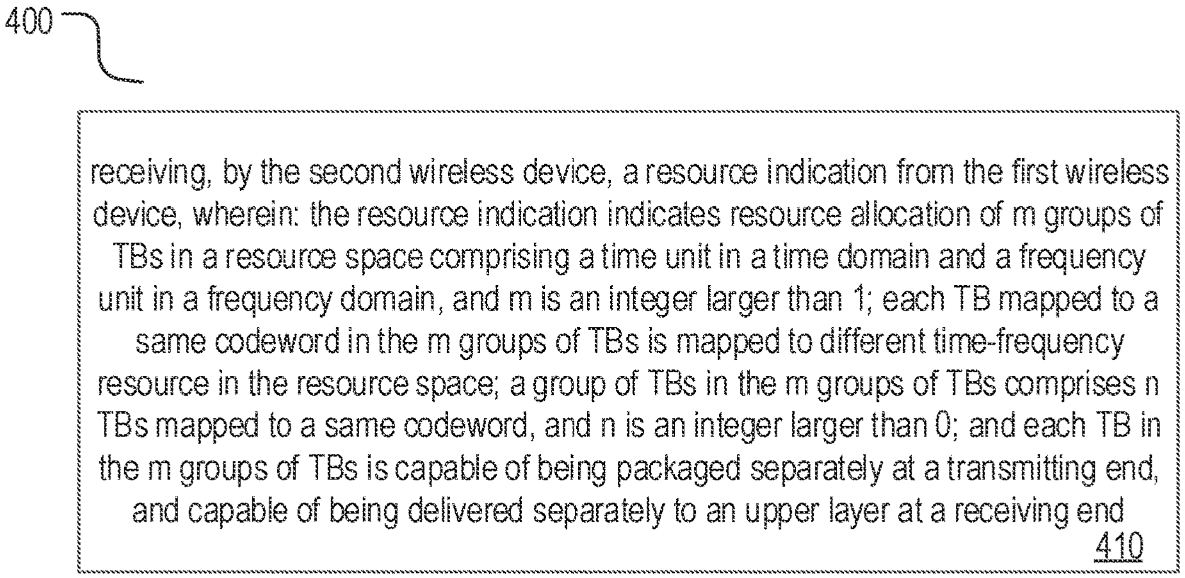
FIG. 4 shows a flow diagram of a method for wireless communication.

In various embodiment, referring to FIG. 4, a method 400 for wireless communication includes transmitting a set of transport block (TB) groups between a first wireless device and a second wireless device. The method 400 may include step 410: receiving, by the second wireless device, a resource indication from the first wireless device, wherein: the resource indication indicates resource allocation of m groups of TBs in a resource space comprising a time unit in a time domain and a frequency unit in a frequency domain, and m is an integer larger than 1; each TB mapped to a same codeword in the m groups of TBs is mapped to different time-frequency resource in the resource space; a group of TBs in the m groups of TBs comprises n TBs mapped to a same codeword, and n is an integer larger than 0; and each TB in the m groups of TBs is capable of being packaged separately at a transmitting end, and capable of being delivered separately to an upper layer at a receiving end.

In some implementations, the resource space corresponds to the m groups of TBs in a hybrid automatic repeat request (HARQ) process in a carrier.

In some other implementations, each TB in the m groups of TBs corresponds to a media access control (MAC) protocol data unit (PDU).

In some other implementations, the time unit comprises at least one of the following: a transmission time interval (TTI), a slot, a sub-frame, or a mini slot.

In some other implementations, the frequency unit comprises at least one of the following: a subcarrier, a resource block (RB), a subband, a bandwidth part (BWP), or a carrier.

In some other implementations, the same codeword comprises at least one of the following: a first codeword, or a second codeword.

In some other implementations, an inter-group mapping policy of the m groups of TBs for a resource comprises at least one of the following: mapping, according to a mapping sequence number of a group, the m groups of TBs in a time domain, and then in a frequency domain; or mapping, according to the mapping sequence number of a group, the m groups of TBs in a frequency domain, and then in a time domain.

In some other implementations, an intra-group mapping policy in a group of TBs for a resource comprises at least one of the following: mapping, according to a mapping sequence number of a TB, the group of TBs in a time domain, and then in a frequency domain; mapping, according to the mapping sequence number of a TB, the group of TBs in a frequency domain, and then in a time domain; or mapping, a TB corresponding to the second codeword according to the mapping sequence number of the TB corresponding to the first codeword in same time-frequency resource.

In some other implementations, the mapping sequence number of a group in the m groups of TBs comprises at least one of the following: an index of the group; a sequence number based on a priority level of the group; or a sequence number generated randomly for the group.

In some other implementations, the mapping sequence number of a TB in the group of TBs comprises at least one of the following: an index of the TB; a sequence number based on a priority level of the TB; or a sequence number generated randomly for the TB.

In some other implementations, the first wireless device is configured to schedule transmission of the m groups of TBs, and the first wireless device comprises at least one of the following: a base station; a MAC layer in a wireless device; a scheduling unit; a user equipment (UE); an on-board unit (OBU); a road-side unit (RSU); or an integrated access and backhaul (IAB) node.

In some other implementations, the second wireless device is configured to receive transmission of the m groups of TBs, and the second wireless device comprises at least one of the following: a user equipment (UE); or an integrated access and backhaul (IAB) node.

In some other implementations, the first wireless device determines a transport block size (TBS) of each TB in the n TBs of the group of TBs by: determining, based on a channel state information, a number of resource elements (REs) in group level, a modulation coding scheme (MCS) of the n TBs in group level, a number of layers of the n TBs in group level; calculating a total size of the n TBs of the group based on the number of REs of the group, the MCS of the n TBs of the group, and the number of layers of the n TBs of the group; and determining the TBS of each TB in the n TBs based on the total size of the n TBs of the group.

In some other implementations, the determining the TBS of each TB in the n TBs based on the total size of the n TBs of the group comprises at least one of the following: determining the TBS of each TB as $$\left\lceil \frac{T}{n} \right\rceil,$$

wherein T is the total size of the n TBs of the group, n is the number of TBs in the n TBs, and $\lceil \ \rceil$ is a ceiling function; determining the TBS of each TB as $$\left\lfloor \frac{T}{n} \right\rfloor,$$

wherein: $\lfloor \ \rfloor$ is a floor function; determining the TBS of each TB based on a pre-determined value; or determining the TBS of each TB based on a pre-determined table.

In some other implementations, the method 400 may further include sending, by the first wireless device to the second wireless device, control information corresponding to the resource allocation of the m groups of TBs, wherein the control information comprises at least one of the following: common control information for m groups of TBs, or control information for a group of TBs.

In some other implementations, the common control information for m groups of TBs comprises at least one of the following: a whole resource space in a time-frequency domain for the m groups of TBs; a whole resource indication in a time domain for the m groups of TBs; a whole resource indication in a frequency domain for the m groups of TBs; power control information for the m groups of TBs; a resource mapping configuration for the m groups of TBs; or a number of groups for the m groups of TBs.

In some other implementations, the control information for a group of TBs comprises at least one of the following: a resource space in a time-frequency domain for the group of TBs; a resource indication in a time domain for the group of TBs; a resource indication in a frequency domain for the group of TBs; or an MCS for the n TBs of the group of TBs; spatial multiplexing information related to a number of layers in group level for the group of TBs; power control information for the group of TBs; a group identification (ID) for the group of TBs; a resource mapping configuration for the group of TBs; a number of TBs in the n TBs in the group; a symbol position information in a time domain for each TB in the group of TBs; or a frequency position information in a frequency domain for each TB in the group of TBs.

In some other implementations, the second wireless device determines a transport block size (TBS) of each TB in the n TBs of the group of TBs by: receiving the control information corresponding to the resource allocation of the m groups of TBs; determining, in a HARQ process, a number of resource elements (REs) for the n TBs in group level, a modulation coding scheme (MCS) for the n TBs in group level, a number of layers for the n TBs in group level; calculating a total size of the n TBs of the group based on the number of REs, the MCS, and the number of layers; and determining the TBS of each TB in the n TBs of the group of TBs based on the total size of the n TBs of the group.

In some other implementations, the control information is transmitted via at least one of the following: a downlink control information (DCI), a radio resource control (RRC) signaling, a high layer signaling, a MAC control element (CE), or system information.

In some other implementations, the determining the TBS of each TB in the n TBs based on the total size comprises at least one of the following: determining the TBS of each TB as $$\frac{T}{n},$$

wherein T is the total size of the n TBs of the group and n is the number of TBs in the n TBs; determining the TBS of each TB as $$\left\lceil \frac{T}{n} \right\rceil,$$

wherein: $\lceil \ \rceil$ is a ceiling function; determining the TBS of each TB as $$\left\lfloor \frac{T}{n} \right\rfloor,$$

wherein: $\lfloor \ \rfloor$ is a floor function; determining the TBS of each TB based on a pre-determined value; or determining the TBS of each TB based on a pre-determined table.

In some other implementations, the HARQ process corresponds to data transmission for a HARQ in the time unit; and the time unit comprises at least one of the following: a transmission time interval (TTI), a slot, a sub-frame, or a mini slot.

In some other implementations, the method 400 may further include a portion or all of the following: receiving, by the second wireless device, the control information from the first wireless device; processing, by the second wireless device, the group of TBs based on the control information by at least one of the following: receiving data from the first wireless device based on the control information from the first wireless device; sending data to the first wireless device based on the control information from the first wireless device; sending data to a third wireless device based on the control information from the first wireless device; or receiving data from the third wireless device based on the control information from the first wireless device.

In some other implementations, the third wireless device is configured to receive or send transmission of the group of TBs, and the third wireless device comprises at least one of the following: a user equipment (UE); or an integrated access and backhaul (IAB) node.

In some other implementations, the method 400 may further include in response to receiving the data from the first wireless device, sending, by the second wireless device, feedback information to the first wireless device by at least one of the following: sending the feedback information separately for each TB in the group of TBs; sending the feedback information together for the group of TBs mapped to a same codeword; sending the feedback information for each code block (CB) in the group of TBs; or sending the feedback information for each code block group (CBG) in the group of TBs.

In some other implementations, the method 400 may further include in response to receiving the data from the second wireless device, sending, by the third wireless device, feedback information to the first wireless device via the second wireless device by at least one of the following: sending the feedback information separately for each TB in the group of TBs; sending the feedback information together for the group of TBs mapped to a same codeword; sending the feedback information for each code block (CB) in the group of TBs; or sending the feedback information for each code block group (CBG) in the group of TBs.

In some other implementations, the method 400 may further include in response to the feedback information being same for each TB in the group of TBs mapped to a same codeword, sending the feedback information comprising a feedback indication for the group of TBs mapped to a same codeword, wherein: in response to each TB in the group of TBs mapped to a same codeword being received successfully, the feedback information comprises an acknowledgement (ACK) indication indicating each TB in the group of TBs mapped to a same codeword being received successfully; and in response to each TB in the group of TBs mapped to a same codeword being received unsuccessfully, the feedback information comprises a NAK indication indicating each TB in the group of TBs mapped to a same codeword being received unsuccessfully.

In some other implementations, the method 400 may further include in response to the feedback information being same for each TB in m groups of TBs, sending the feedback information comprising a feedback indication for the m groups of TBs, wherein: in response to each TB mapped to a same codeword in the m groups of TBs being received successfully, the feedback information comprises an acknowledgement (ACK) indication indicating each TB mapped to a same codeword in each group of TBs being received successfully; and in response to each TB mapped to a same codeword in the m groups of TBs being received unsuccessfully, the feedback information comprises a NAK indication indicating each TB mapped to a same codeword in each group of TBs being received unsuccessfully.

Figure 5:
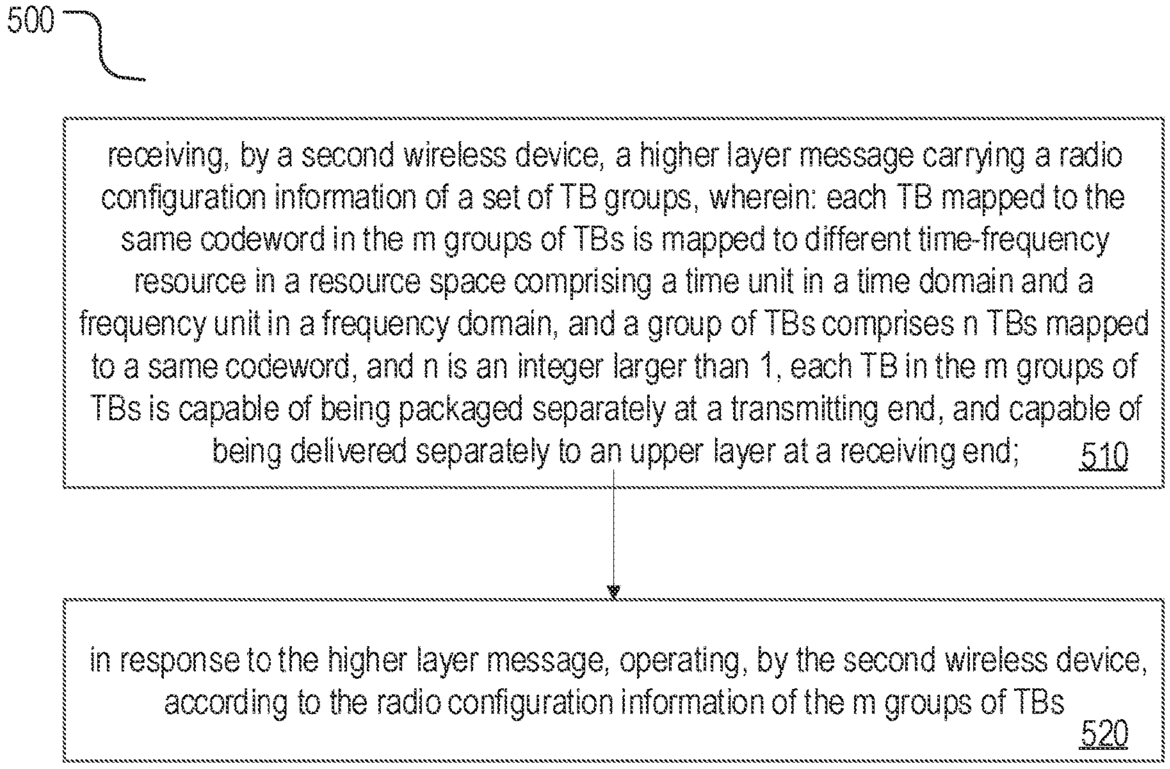
FIG. 5 shows a flow diagram of a method for wireless communication.

In various embodiment, referring to FIG. 5, a method 500 for wireless communication. The method 500 may include a portion or all of the following steps: step 510, receiving, by a second wireless device, a higher layer message carrying a radio configuration information of a set of TB groups, wherein: each TB mapped to the same codeword in the m groups of TBs is mapped to different time-frequency resource in a resource space comprising a time unit in a time domain and a frequency unit in a frequency domain, and m is an integer larger than 1, a group of TBs comprises n TBs mapped to a same codeword, and n is an integer larger than 0, each TB in the m groups of TBs is capable of being packaged separately at a transmitting end, and capable of being delivered separately to an upper layer at a receiving end; and/or step 520, in response to the higher layer message, operating, by the second wireless device, according to the radio configuration information of the m groups of TBs.

In some implementations, the higher layer message is at least one of the following: a layer 3 (L3) layer message, or a radio resource control (RRC) message.

In some other implementations, the radio configuration information comprises at least one of the following: a value of n, a value of m, an inter-group resource mapping policy, or an intra-group resource mapping policy.

In some other implementations, the resource space corresponds to the m groups of TBs in a hybrid automatic repeat request (HARQ) process in a carrier.

In some other implementations, each TB in the m groups of TBs corresponds to a media access control (MAC) protocol data unit (PDU).

In some other implementations, the time unit comprises at least one of the following: a transmission time interval (TTI), a slot, a sub-frame, or a mini slot.

In some other implementations, the frequency unit comprises at least one of the following: a subcarrier, a resource block (RB), a subband, a bandwidth part (BWP), or a carrier.

In some other implementations, the same codeword comprises at least one of the following: a first codeword, or a second codeword.

In some other implementations, an inter-group mapping policy of the m groups of TBs for a resource comprises at least one of the following: mapping, according to a mapping sequence number of each group, the m groups of TBs in a time domain, and then in a frequency domain; or mapping, according to the mapping sequence number of each group, the m groups of TBs in a frequency domain, and then in a time domain.

In some other implementations, an intra-group mapping policy in the same one group of TBs for a resource comprises at least one of the following: mapping, according to a mapping sequence number of each TB, the group of TBs in a time domain, and then in a frequency domain; mapping, according to the mapping sequence number of each TB, the group of TBs in a frequency domain, and then in a time domain; or mapping, a TB corresponding to the second codeword according to the mapping sequence number of the TB corresponding to the first codeword in same time-frequency resource.

In some other implementations, the mapping sequence number of a group in the m groups of TBs comprises at least one of the following: an index of the group; a sequence number based on a priority level of the group; or a sequence number generated randomly for the group;

In some other implementations, the mapping sequence number of a TB in the group of TBs comprises at least one of the following: an index of the TB; a sequence number based on a priority level of the TB; or a sequence number generated randomly for the TB;

In some other implementations, the priority level comprises at least one of the following: a priority level based on a service demand from an upper layer; a priority level based on a quality of service (QOS) from the upper layer; or a priority level based on a repeat transmission of each TB.

The present disclosure further describes various embodiments below, which serve as examples and should not be interpreted as any limitations to the present disclosure. The various embodiments/examples in the present disclosure may be described in scenarios of a single codeword transmission, and may be applicable in scenarios of a two codeword transmission.

Embodiment 1: Transmission of Multiple TB Groups in a TTI

Figure 6:
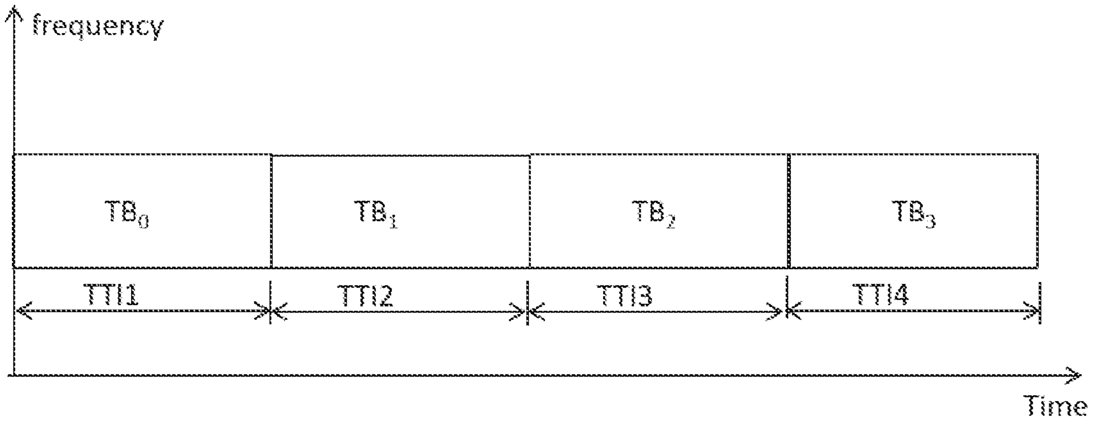
FIG. 6 shows a schematic diagram of an embodiment in the present disclosure for wireless communication.

In some implementations of a 5G system, for a single codeword transmission on a single carrier, each HARQ process may only transmit one TB in one TTI. Referring to FIG. 6, when four TBs ($TB_0$, $TB_1$, $TB_2$, and $TB_3$) are required for transmission, four TTIs (TTI1, TTI2, TTI3, and TTI4) may be needed corresponding to the four TBs, respectively in a time domain and a frequency domain.

In various implementations, multiple TBs may be transmitted in groups (i.e., TB group), so that multiple TB groups may be transmitted in one TTI. For a TB group, scheduling information in group level may be used for TBs in the TB group. Between TB groups, different scheduling information may be used for TBs from different TB groups. In a large bandwidth scenario, resources may be abundant in a frequency domain, and each user may be allocated with enough bandwidth. A group level scheduling method on a single carrier may be used to simultaneously schedule and transmit multiple TB groups on a TTI, and each TB group (TBG) may include multiple TBs, which may make better use of frequency domain resources to achieve high throughput and low latency requirements at the same time. In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

In some implementations of the TB group methods, each TB group may use different scheduling transmission information such as different MCS in group level according to the channel state information of different frequency bands, which may adapt to the wireless environment and system carrier resources, improving system performance. For one example, referring to FIGS. 7A, 7B, and 7C, there may be 2 TB groups (TBG0 and TBG1). The TB group TBG0 may include 4 TBs ($TB_0$, $TB_1$, $TB_2$, and $TB_3$), and the TB group TBG1 may include 4 TBs ($TB_4$, $TB_5$, $TB_6$, and $TB_7$).

Taking a single codeword stream as an example, the various implementations for mapping/scheduling multiple TB groups may include a portion or all of the following steps.

Step 1-1: A base station may perform scheduling on the user's 2 TB groups (TBG0 and TBG1) jointly, and may determine the scheduling information of each TB group. The scheduling information of each TB group may include at least one of the following: group-level MCS and group-level time-frequency resource ranges to each TB group, group-level space transmission mode. In some implementations, the scheduling information of different TB groups is independent of each other, and may be different or same for different group. In some implementations, all TBs belonging to a same TB group may use the same group-level scheduling information. For example, $TB_0$, $TB_1$, $TB_2$, and $TB_3$ in the TBG0 may use a set of MCS, layer mapping, and time-frequency resource ranges. In some other implementations, there may be two or more than two groups of TBs.

Figure 7A:
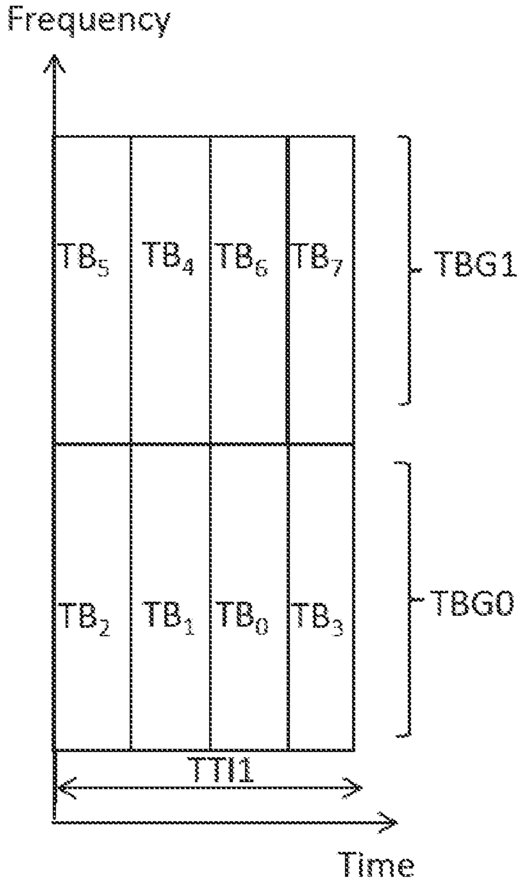
FIG. 7A shows a schematic diagram of an embodiment in the present disclosure for wireless communication.
Figure 7B:
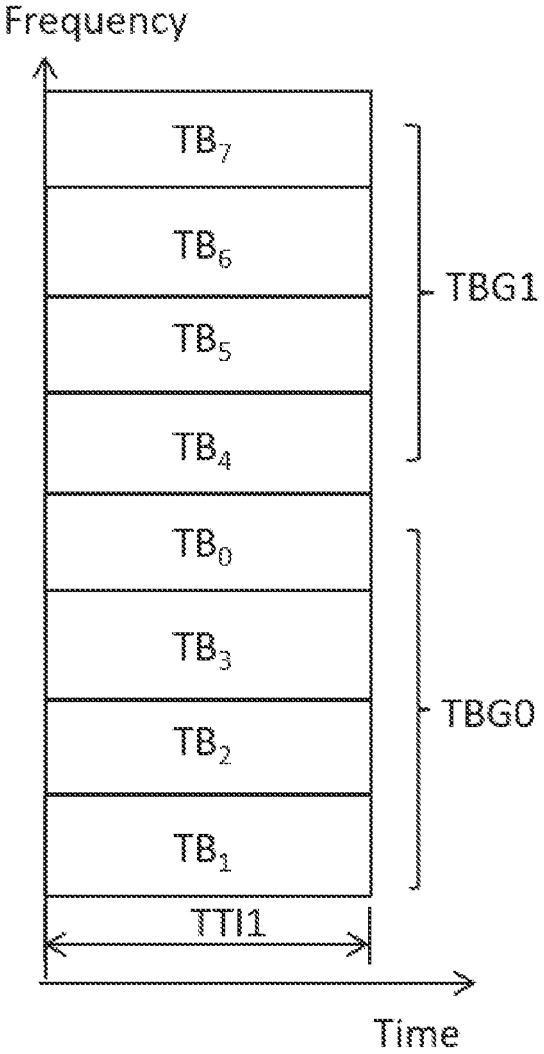
FIG. 7B shows a schematic diagram of an embodiment in the present disclosure for wireless communication.
Figure 7C:
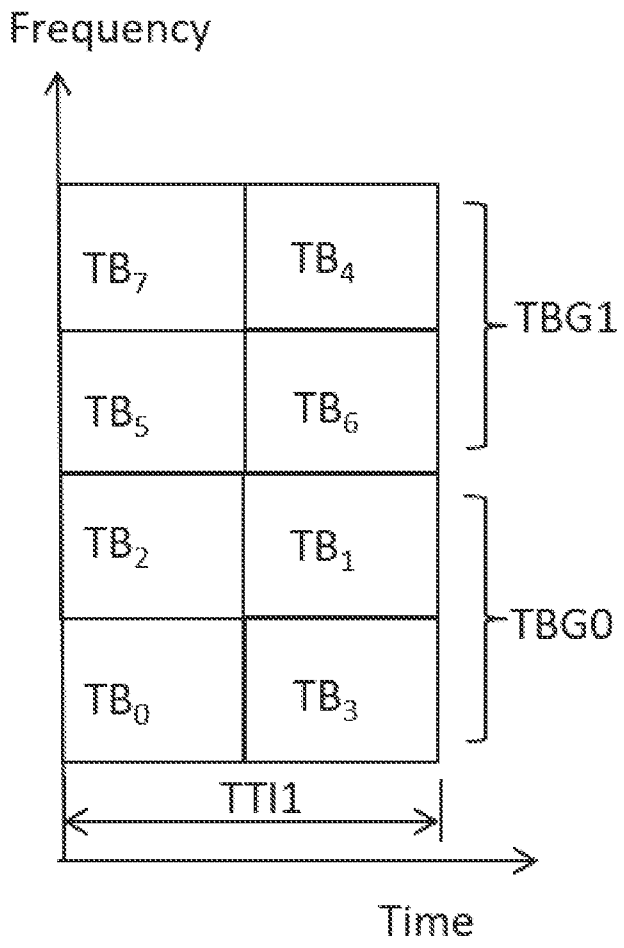
FIG. 7C shows a schematic diagram of an embodiment in the present disclosure for wireless communication.

Step 1-2: The base station allocates time-frequency resources to each TB in each TB group according to the group-level scheduling information. For example, the time domain symbol position and frequency domain resource position of each TB (within TB0, TB1, TB2, and TB3) are determined according to the scheduling information of TBG0. FIGS. 7A, 7B, and 7C shows schematic diagrams of three different location mapping of each TB in TBG0 and TBG1.

Step 1-3: The base station performs physical layer processing and mapping for each TB in each TB group.

Step 1-4: The base station sends the scheduling information indication of each TB group to the UE, for example, via DCI. The scheduling information indication of each TB group includes group-level scheduling information. The group-level scheduling information may include at least one of the following: a TB group-level MCS, a TB group-level layer mapping information (for example, the number of layers of the group), a TB group-level time-frequency domain range, TB group-level mapping rules, and/or TB group-level group ID. The scheduling information indication may include TB-level dedicated scheduling information, which includes at least one of the following: an ID of each TB, a specific symbol position of each TB in the time domain, start and end positions of the TB symbol in the time domain, the TB time domain position bitmap, and/or the specific position of each TB frequency domain.

Step 1-5: A UE performs reception processing on each TB according to the received scheduling information instruction.

Step 1-6: After the UE decodes the TB, it sends feedback to the base station. The feedback may include at least one of the following: a feedback based on all TB groups jointly, a feedback based on a TB group jointly, a feedback based on each TB, a feedback based on each CB, and/or a feedback based on each CBG.

In various implementations, multiple TB groups may be transmitted in one TTI, and each TB group may use different scheduling information, for example, the MCS of each group is not related to other groups and each group has its own MCS. The total number of TBs may be increased as needed to satisfy the requirements of high throughput.

In various implementations, each TB may be decoded and fed back independently, and each successfully decoded TB may be independently delivered to a MAC layer without waiting for other TBs being received/decoded, thus further reducing the transmission delay.

Embodiment 2: TB Group-Level Joint Feedback

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

In some implementations, a transmitting end may schedule transmission on a level of TB group, and a receiving end may decode on a level of CBG and give feedback based on a level of CBG.

In some other implementations, after receiving all CBGs of a TB, it may also decode on a level of TB and give feedback on a level of TB.

In some other implementations, after a UE receives all TBs in each TB group, the UE may send feedback (e.g, ACK/NACK feedback) on a level of TB group.

For example, when all TBs in a TB group are decoded correctly, only a 1-bit ACK is sent as the feedback of the TB group, indicating that all TBs in the TB group have been successfully transmitted. When all TBs in a TB group have failed to decode, only a 1-bit NACK is sent as the feedback of the TB group, which means that all TBs in the TB group are unsuccessful in transmission. Through TB group-level feedback, the feedback overhead of TB transmission is reduced.

Embodiment 3: Two-Level Scheduling

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

In some implementations, a base station may regard a TB group as a combined large TB, and the base station may schedule this TB group jointly. Then, the base station allocates a specific time-frequency resource location for each TB in the TB group.

For a first-level scheduling on a level of TB group, a base station may schedule the TB group and determine the schedule result to each group, which may include at least one of the following: an MCS of each group, time-frequency domain resources of each group, layer mapping information of each group (for example, the number of layers of each group), mapping rules for each group, and/or etc. For example, a group is mapped to a specific resource space according to its mapping sequence number based on a priority level of the group.

For a second-level scheduling on a level of TB individually, a base station assigns specific symbol positions in the time domain and specific positions in the frequency domain to each TB according to the TB group scheduling information. For example, a TB is mapped to a specific time-frequency resource according to its mapping sequence number based on a priority level of the TB.

Embodiment 4: Common and Dedicated Scheduling Information in DCI

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

A base station may transmit a DCI to a UE for scheduling transmission of the TB group of the UE. The DCI may include common group scheduling information for all TB groups, TB group-level scheduling information and/or TB-level scheduling information. The common group scheduling information for all TB groups may mean that each group use the same scheduling information. The common group scheduling information may include at least one of the following: a time-frequency domain resource space for all groups, common power control parameters for all groups; a resource mapping configuration for all groups; a group number m; and/or etc.

The TB group-level scheduling information may mean that all TBs in the TB group use the same scheduling information. The TB group-level scheduling information for all TB mapped to a same codeword of one group may include at least one of the following: an MCS, a time-frequency domain resource range, mapping rules, a TB group ID, TB number in the TB group, power control parameters, and antenna transmission parameters including layer mapping (for example, the number of layers), etc. In two codeword transmission, TB group-level scheduling information may include scheduling information of the first codeword and the second codeword, such as a group MCS for the first codeword, and/or a group MCS for the second codeword.

The base station also sends TB-level scheduling information used by each TB. The TB-level scheduling information includes at least one of the following: the TB number, the specific symbol position of the TB in the time domain, the start and end positions of the TB time domain symbol, the TB time domain position bitmap, the specific position of the TB frequency domain, and/or the TBS indication.

Embodiment 5: In Semi-Persistent Scheduling (SPS): Same Scheduling Information for a Period of Time In a semi-persistent scheduling (SPS), a base station may use a same scheduling information to perform simultaneous scheduling and transmission of multiple TBs on a TB group-level of a single HARQ process within a period of time, thereby reducing overhead to indicate the scheduling information.

In the SPS scheduling scenario, the base station may determine that a single carrier transmits multiple TB scheduling information on a TB group-level for a single HARQ process on a TTI. For example, in a period of time, which may be relatively long, a number and a size of TBs on a TB group-level in a single HARQ process may remain unchanged, an MCS on a TB group-level may remain unchanged, and/or a TB time-frequency resource location on a TB group-level may remain unchanged.

Embodiment 6: Scheduling Transmission of Multiple TBs in a Two Codeword Transmission For a 5G system, when a spatial multiplexing technology is used, a single carrier may be allowed to transmit two TBs of the user in one HARQ process in one TTI in the manner of two codeword transmission, and each codeword corresponds to one TB.

In various embodiments in the present disclosure, two TBs in one HARQ process in one TTI may be transmitted in scenarios of multi-TB transmission in a two codeword transmission.

Figure 8A:
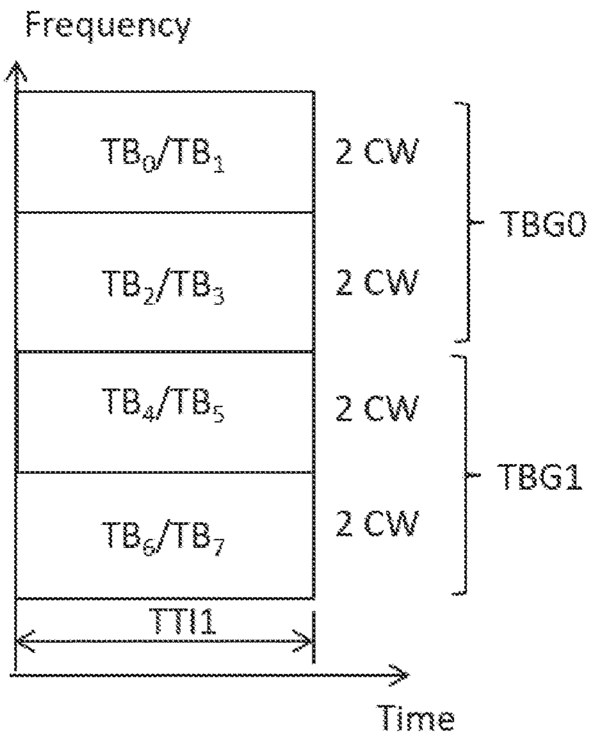
FIG. 8A shows a schematic diagram of an embodiment in the present disclosure for wireless communication.

As shown in FIG. 8A, in a single carrier and in one HARQ process, a UE may achieve 8 TB transmission with two TB groups in a dual codeword stream/transmission within a TTI. For example, $TB_0$ and $TB_1$ corresponding two codeword is in the same time-frequency resource. $TB_0$ corresponds the first codeword, and $TB_1$ corresponds the second codeword. There are 4 TBs ($TB_0$, $TB_2$, $TB_4$, $TB_6$) in the first codeword in one TTI, and 4 TBs ($TB_1$, $TB_3$, $TB_5$, $TB_7$) in the second codeword in one TTI. The $TB_0$ and $TB_2$ in the TBG0 use a set of parameters for example the MCS parameter is MCS4 for the first codeword. The $TB_1$ and $TB_3$ in the TBG0 use another set of parameters for example the MCS parameter is MCS5 for the second codeword. In a similar manner, the $TB_4$ and $TB_6$ in the TBG1 use a set of parameters for the first codeword irrelevant to TBG0, for example the MCS parameter is MCS6. The $TB_5$ and $TB_7$ in the TBG1 use another set of parameters for the second codeword irrelevant to TBG0, for example the MCS parameter is MCS7. The set of parameters for the TBG1 may be independent of the set of parameters for the TBG0, and vice versa, the set of parameters for TBG0 is independent of the set of parameters for the TBG1.

Figure 8B:
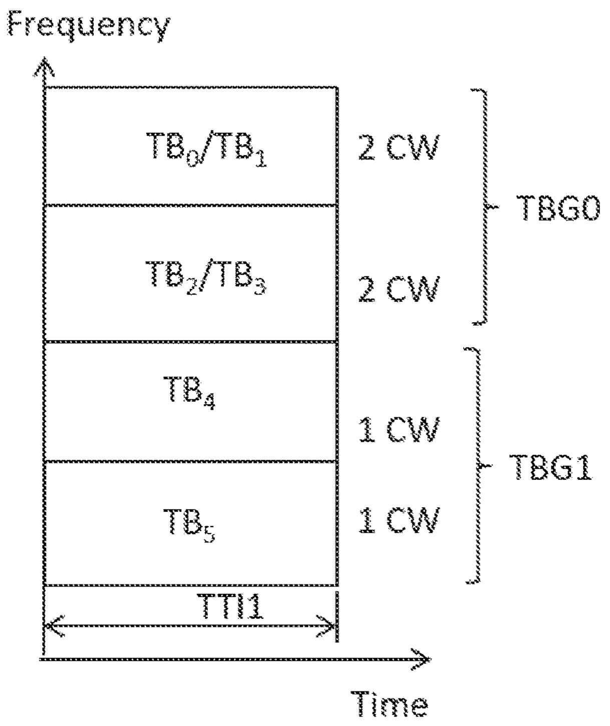
FIG. 8B shows a schematic diagram of an embodiment in the present disclosure for wireless communication.

In some other implementations, another example of multi-TBG transmission on a TB-group level by a UE in a HARQ process of a TTI in a two codeword transmission may be described. In some other implementations, a mixed transmission of a single codeword transmission and a two codeword transmission may be realized on different resources for a same UE. FIG. 8B shows an example of the mixed transmission in frequency domain resources, wherein there are 6 TBs ($TB_1$, $TB_2$, $TB_3$, $TB_4$, $TB_5$, and $TB_6$). In two codeword (2 CW) transmission, $TB_0$ and $TB_1$ may occupy the same time-frequency resources, $TB_2$ and $TB_3$ may occupy the same time-frequency resources. In a single codeword (1 CW) transmission, $TB_4$ and $TB_5$ may occupy the different time-frequency resource. The four TBs ($TB_0$, $TB_1$, $TB_2$, and $TB_3$) may belong to a TB group (TBG0), and the two TBs ($TB_4$ and $TB_5$) may belong to another TB group (TBG1). In this example, the transmission of 2 TBGs may be achieved under the mixture of single codeword stream and two codeword stream.

Embodiment 7: Configuration of m, n and Mapping Policy for Multiple TBs Via RRC Signaling In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

For TB groups transmission in a TTI and in a single HARQ process on a single carrier, a network side, for example a base station, may send configuration information to a terminal via RRC signaling. The terminal may receive the RRC configuration message. The configuration information may include at least one of the following: a group number m, a TB number n in same codeword transmission, one or more mapping rule for a set of TB groups, and/or one or more mapping rule for a set of TBs.

For example, the network side may initiate the RRC reconfiguration process, and the RRC configuration information includes fields corresponding to transmission of multiple TBs. The fields in the configuration information may include at least one of the following: the total group number, the total number n of TBs in the same codeword transmission in the TB group transmission, a resource mapping rule for the groups, and/or a resource mapping rule for the TBs. The UE may receive the RRC reconfiguration message. When the RRC reconfiguration message contains a transmission field for the TB groups, the lower layer configuration of multi-TB is performed.

In some implementations, m is an integer greater than 1, n is an integer greater than 0, and each TB of the n TBs may be independently packaged at the transmitting end, and may be independently delivered to the upper layer at the receiving end. Each TB group includes at least one TB. TB group resource mapping policy may correspond to a group mapping strategy wherein each group may be mapped to a different time-frequency resource. TB resource mapping policy may correspond to a TB mapping strategy wherein each TB in multiple TBs may be mapped to a different time-frequency resource.

Embodiment 8: Calculation of TB Size for Multiple TBs in a HARQ Process

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

The receiving side, for example a UE (UE1) in single codeword transmission, may receive transmissions of multiple TBs in a HARQ process. The multiple TBs is the TBs of m groups and there are several TBs in one group. The number of TB may be different or same in each group.

Upon receiving scheduling control information (for example, a DCI signal), the UE1 may perform, according to the indication of the scheduling control information, reception processing on the TBs of the m groups within a common time-frequency domain on a carrier on a HARQ process. the scheduling control information including the mapping rules, an MCS for each groups and layer mapping information of each group (for example, the number of layers of each group). According to the scheduling control information, the receiving side may obtain the control information of the whole groups, one group and one TB. The receiving side can infer the total size of one group and the size of each TB. The method for determining a TB size (TBS) of TB may include a portion or all of the following steps.

Step 8-1: A UE may determine a resource space of m groups.

Step 8-2: A UE may determine the resource space of each group, the MCS of each group and layer number of each group according to the scheduling control information.

Step 8-3: The UE may determine a number of resource elements (REs) for the TB in a group in a time-frequency domain in a HARQ process. For one example, the TB size allocation rule may include a look-up table to obtain the TB size according to the TB number of the group. For another example, the TB size allocation rule may include evenly allocate resources in resource space of the group.

Step 8-4: The UE may calculate a TB size of the TB according to the number of REs for the TB of the group, an MCS of the group and a number of layers of the group.

Embodiment 9: Device-to-Device (D2D) Scenario

In a device-to-device (D2D) scenario, a base station may determine the scheduling information of a UE (for example, UE1). The UE1 may send TB groups data to another UE (for example UE2) in one HARQ process according to the TB groups scheduling information of a single HARQ process determined by the base station. The UE2 may send feedback to the base station after receiving the data. The embodiment may be applicable to other scenarios, for example but not limited to, integrated access and backhaul (IAB).

Embodiment 10: Transmission of Multiple TBs in a TTI

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

Figure 9:
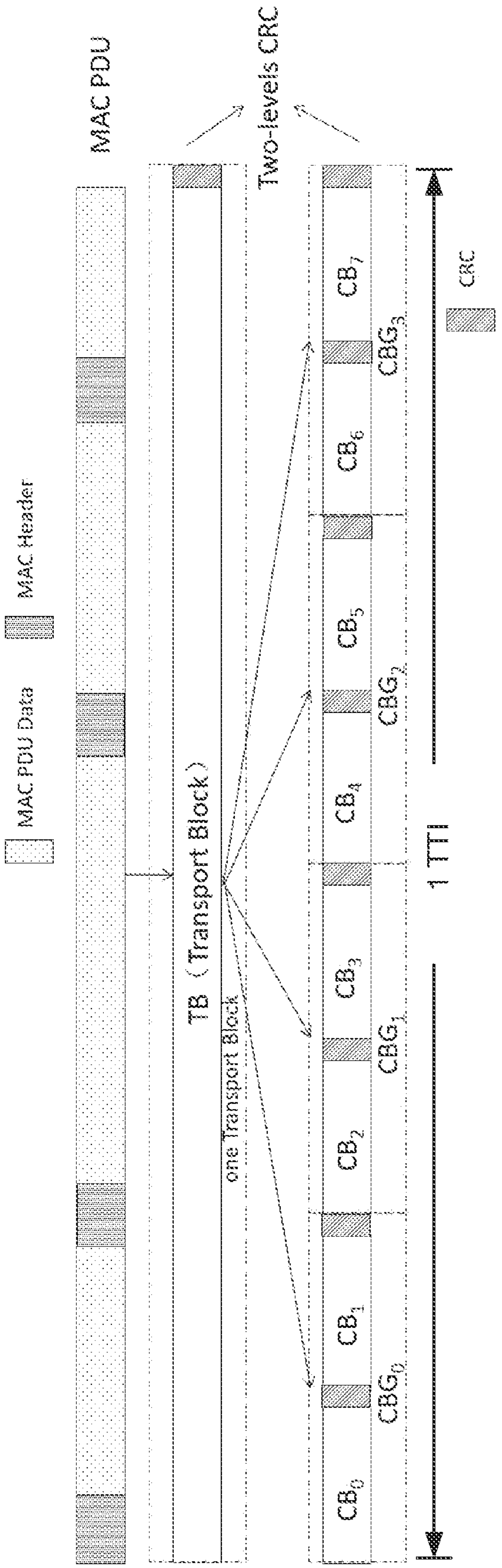
FIG. 9 shows a schematic diagram of an embodiment in the present disclosure for wireless communication.

As shown in FIG. 9, in a 5G system, at a MAC layer, a MAC PDU may be composed of multiple sub-PDUs, and each sub-PDU is composed of a sub-header and a data part. MAC PDU is a data unit that may be delivered to a physical layer after the MAC layer protocol is processed. One MAC PDU may correspond to one TB of the physical layer. At the physical layer, a TB may be divided into one or more code block (CB) and/or one or more code block group (CBG). In a TTI and in a single HARQ process, when spatial multiplexing and multi-carrier are not considered, only one TB may be transmitted on a single carrier. In one TTI, only one TB is delivered to MAC layer.

Figure 10:
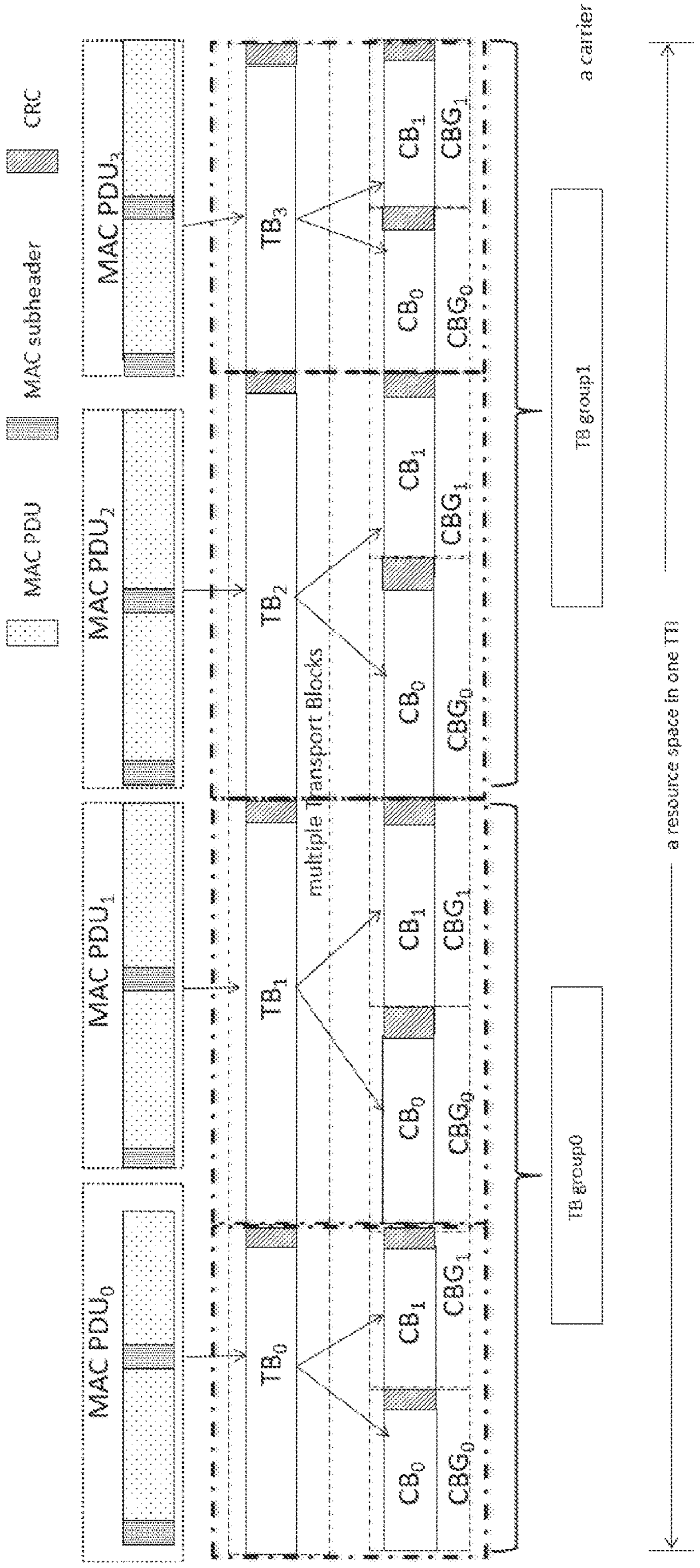
FIG. 10 shows a schematic diagram of an embodiment in the present disclosure for wireless communication.

As shown in FIG. 10, in some implementations, one MAC PDU may still correspond to one TB of a physical layer. At the physical layer, each TB may still be divided into one or more CB and/or one or more CBG. In FIG. 10, there are 2 groups of TBs and 2 TB in each group. In other words, m is 2 for the group number and n is 2 for the TB number in the group.

In a single HARQ process in a TTI, multiple MAC PDUs may be used to map to multiple TBs, and multiple TBs may be transmitted on a single carrier on a TTI. At the transmitting end, each TB corresponds to an independent MAC PDU, and each TB may independently be packaged at the transmitting end and be delivered to the MAC layer independently at the receiving end. At the receiving end, when receiving n TBs, there may be a situation where one or more TBs are transmitted correctly, and one or more TBs are transmitted incorrectly. In response to this situation, the data of correct TBs may be directly delivered to the MAC layer without waiting for the retransmission of the wrong (incorrectly transmitted) one or more TBs. In one TTI, one or more TBs may be delivered to MAC layer. This implementation may achieve lower latency while ensuring high throughput.

Figure 11:
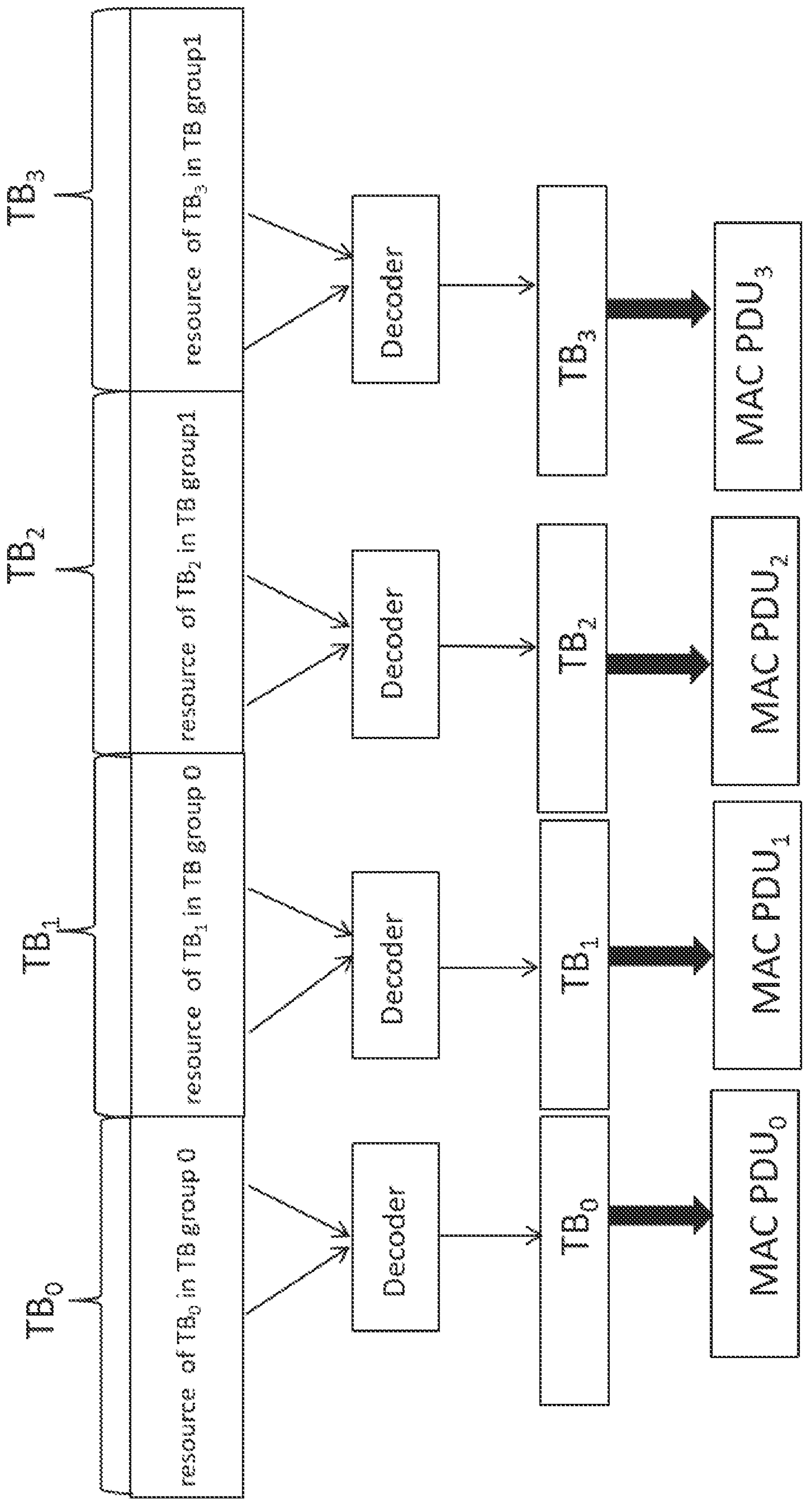
FIG. 11 shows a schematic diagram of an embodiment in the present disclosure for wireless communication.

In some implementations, multiple MAC PDUs may be used to map to multiple TBs. As shown in FIG. 11, the receiving end may include multiple decoders to decode each of the multiple TBs independently according to the scheduling instructions of multiple TBs. When multiple TBs in one TTI are mapped to different symbol of the time domain, the front (or earlier) TB with lower latency requirement then the behind (or later) TB. The performance of the system may be further improved by differential transmission latency. When multiple TBs in one TTI are mapped to different resource block (RB) of the frequency domain, the TBs of one TTI can be received simultaneously and parallel processing. The performance of the system may be further improved by decreasing the processing delay of decoding and achieving the effect of low latency.

The present disclosure describes methods, apparatus, and computer-readable medium for wireless communication. The present disclosure addressed the issues with transmitting multiple transport block (TB) groups. The methods, devices, and computer-readable medium described in the present disclosure may facilitate the performance of wireless communication by transmitting multiple TB groups, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:

transmitting a set of transport block (TB) groups between a first wireless device and a second wireless device by:

receiving, by the second wireless device, a resource indication from the first wireless device, wherein:

the resource indication indicates resource allocation of m groups of TBs in a resource space comprising a time unit in a time domain and a frequency unit in a frequency domain, and m is an integer larger than 1;

within the m groups of TBs, each TB mapped to a same codeword is allocated different time-frequency resources in the resource space;

a group among the m groups of TBs comprises n TBs that are mapped to a same codeword, and n is an integer larger than 0; and each TB in the m groups of TBs is capable of being packaged separately at a transmitting end, and capable of being delivered separately to an upper layer at a receiving end.

2. The method according to claim 1, wherein:

the resource space corresponds to the m groups of TBs in a hybrid automatic repeat request (HARQ) process in a carrier.

3. The method according to claim 1, wherein:

each TB in the m groups of TBs corresponds to a media access control (MAC) protocol data unit (PDU).

4. The method according to claim 1, wherein:

the time unit comprises at least one of the following:

a transmission time interval (TTI), a slot, a sub-frame, or a mini slot.

5. The method according to claim 1, wherein:

the frequency unit comprises at least one of the following:

a subcarrier, a resource block (RB), a subband, a bandwidth part (BWP), or a carrier.

6. The method according to claim 1, wherein the same codeword comprises at least one of the following: a first codeword, or a second codeword.

7. The method according to claim 1, wherein:

an inter-group mapping policy of the m groups of TBs for a resource comprises at least one of the following:

mapping, according to a mapping sequence number of each group, the m groups of TBs in a time domain, and then in a frequency domain; or mapping, according to the mapping sequence number of each group, the m groups of TBs in a frequency domain, and then in a time domain.

8. The method according to claim 7, wherein:

an intra-group mapping policy in a group of TBs for a resource comprises at least one of the following:

mapping, according to a mapping sequence number of each TB, the n TBs of the group of TBs in a time domain, and then in a frequency domain;

mapping, according to the mapping sequence number of each TB, the n TBs of the group of TBs in a frequency domain, and then in a time domain; or mapping, a TB corresponding to the second codeword according to the mapping sequence number of the TB corresponding to the first codeword in same time-frequency resource.

9. The method according to claim 8, wherein:

the mapping sequence number of a TB in the n TBs of the group of TBs comprises at least one of the following:

an index of the TB;

a sequence number based on a priority level of the TB; or a sequence number generated randomly for the TB.

10. The method according to claim 7, wherein:

the mapping sequence number of a group in the m groups of TBs comprises at least one of the following:

an index of the group;

a sequence number based on a priority level of the group; or a sequence number generated randomly for the group.

11. The method according to claim 1, further comprising:

receiving, by the second wireless device, control information corresponding to the m groups of TBs from the first wireless device, wherein the control information comprises at least one of the following:

common control information for m groups of TBs, or control information for a group of TBs.

12. The method according to claim 11, wherein the common control information for m groups of TBs comprises at least one of the following:

a whole resource space in a time-frequency domain for the m groups of TBs;

a whole resource indication in a time domain for the m groups of TBs;

a whole resource indication in a frequency domain for the m groups of TBs;

power control information for the m groups of TBs;

a resource mapping configuration for the m groups of TBs; or a number of groups for the m groups of TBs.

13. The method according to claim 11, wherein the control information for a group of TBs comprises at least one of the following:

a resource space in a time-frequency domain for the group of TBs;

a resource indication in a time domain for the group of TBs;

a resource indication in a frequency domain for the group of TBs;

an MCS for the group of TBs;

spatial multiplexing information related to a number of layers for the group of TBs;

power control information for the group of TBs;

a group identification (ID) for the group of TBs;

a resource mapping configuration for the group of TBs;

a number of TBs in the n TBs in the group;

a symbol position information in a time domain for each TB in the group of TBs; or a frequency position information in a frequency domain for each TB in the group of TBs.

14. The method according to claim 11, wherein:

the second wireless device determines a transport block size (TBS) of each TB in the n TBs of the group of TBs by:

receiving the control information corresponding to the m groups of TBs;

determining, in a HARQ process, a number of resource elements (REs) for the n TBs in group level, a modulation coding scheme (MCS) for the n TBs in group level, a number of layers for the n TBs in group level;

calculating a total size of the n TBs of the group based on the number of REs, the MCS, and the number of layers; and determining the TBS of each TB in the n TBs of the group of TBs based on the total size of the group.

15. The method according to claim 14, wherein the determining the TBS of each TB in the n TBs based on the total size comprises at least one of the following:

determining the TBS of each TB as T/n, wherein T is the total size of the group and n is the number of TBs in the n TBs;

determining the TBS of each TB as $\lceil T/n \rceil$, wherein $\lceil\ \rceil$ is a ceiling function;

determining the TBS of each TB as $\lfloor T/n \rfloor$, wherein $\lfloor\ \rfloor$ is a floor function;

determining the TBS of each TB based on a pre-determined value; or determining the TBS of each TB based on a pre-determined table.

16. The method according to claim 11, wherein:

the control information is transmitted via at least one of the following:

a downlink control information (DCI), a radio resource control (RRC) signaling, a high layer signaling, a MAC control element (CE), or system information.

17. The method according to claim 11, further comprising:

receiving, by the second wireless device, the control information from the first wireless device;

processing, by the second wireless device, the group of TBs based on the control information by at least one of the following:

receiving data from the first wireless device based on the control information from the first wireless device;

sending data to the first wireless device based on the control information from the first wireless device;

sending data to a third wireless device based on the control information from the first wireless device; or receiving data from the third wireless device based on the control information from the first wireless device.

18. The method according to claim 17, further comprising:

in response to receiving the data from the first wireless device, sending, by the second wireless device, feedback information to the first wireless device by at least one of the following:

sending the feedback information separately for each TB in the group of TBs;

sending the feedback information together for the group of TBs mapped to a same codeword;

sending the feedback information for each code block (CB) in the group of TBs; or sending the feedback information for each code block group (CBG) in the group of TBs.

19. The method according to claim 18, further comprising:

in response to the feedback information being same for each TB in the group of TBs, sending the feedback information comprising a feedback indication for the group of TBs, wherein:

in response to each TB mapped to a same codeword the group of TBs being received successfully, the feedback information comprises an acknowledgement (ACK) indication indicating each TB mapped to a same codeword in the group of TBs being received successfully; and in response to each TB mapped to a same codeword in the group of TBs being received unsuccessfully, the feedback information comprises a NAK indication indicating each TB mapped to a same codeword in the group of TBs being received unsuccessfully.

20. The method according to claim 18, further comprising:

in response to the feedback information being same for each TB in m groups of TBs, sending the feedback information comprising a feedback indication for the m groups of TBs, wherein:

in response to each TB in the m groups of TBs being received successfully, the feedback information comprises an acknowledgement (ACK) indication indicating each TB in each group of TBs being received successfully; and in response to each TB in the m groups of TBs being received unsuccessfully, the feedback information comprises a NAK indication indicating each TB in each group of TBs being received unsuccessfully.

21. The method according to claim 1, wherein:

the first wireless device is configured to schedule transmission of the m groups of TBs, and the first wireless device comprises at least one of the following:

a base station;

a MAC layer in a wireless device;

a scheduling unit;

a user equipment (UE);

an on-board unit (OBU);

a road-side unit (RSU); or an integrated access and backhaul (IAB) node.

22. The method according to claim 1, wherein:

the second wireless device is configured to receive transmission of the m groups of TBs, and the second wireless device comprises at least one of the following:

a user equipment (UE); or an integrated access and backhaul (IAB) node.

23. A wireless communications apparatus comprising:

a memory operable to store computer-readable instructions; and a processor circuitry operable to read the computer-readable instructions, the processor circuitry when executing the computer-readable instructions is configured to:

transmit a set of transport block (TB) groups between a first wireless device and a second wireless device by:

receive, by the second wireless device, a resource indication from the first wireless device, wherein:

the resource indication indicates resource allocation of m groups of TBs in a resource space comprising a time unit in a time domain and a frequency unit in a frequency domain, and m is an integer larger than 1;

within the m groups of TBs, each TB mapped to a same codeword is allocated different time-frequency resources in the resource space;

a group among the m groups of TBs comprises n TBs that are mapped to a same codeword, and n is an integer larger than 0; and each TB in the m groups of TBs is capable of being packaged separately at a transmitting end, and capable of being delivered separately to an upper layer at a receiving end.

* * * * *